July 1, 1969     H. F. BRAMLEY ET AL     3,452,572
HIGH-VELOCITY SHEARING MACHINE
Filed Feb. 27, 1967

INVENTORS
HAL F. BRAMLEY
FELIX A. CHIPLIS
DAVID E. DUNKLE
GEORGE W. TAIVALKOSKI
BY Frank Jenkins & Hanley
ATTORNEYS INVENTORS
HAL F. BRAMLEY
FELIX A. CHIPLIS
DAVID E. DUNKLE
GEORGE W. TAIVALKOSKI
BY
Trask, Jenkins & Hanley
ATTORNEYS

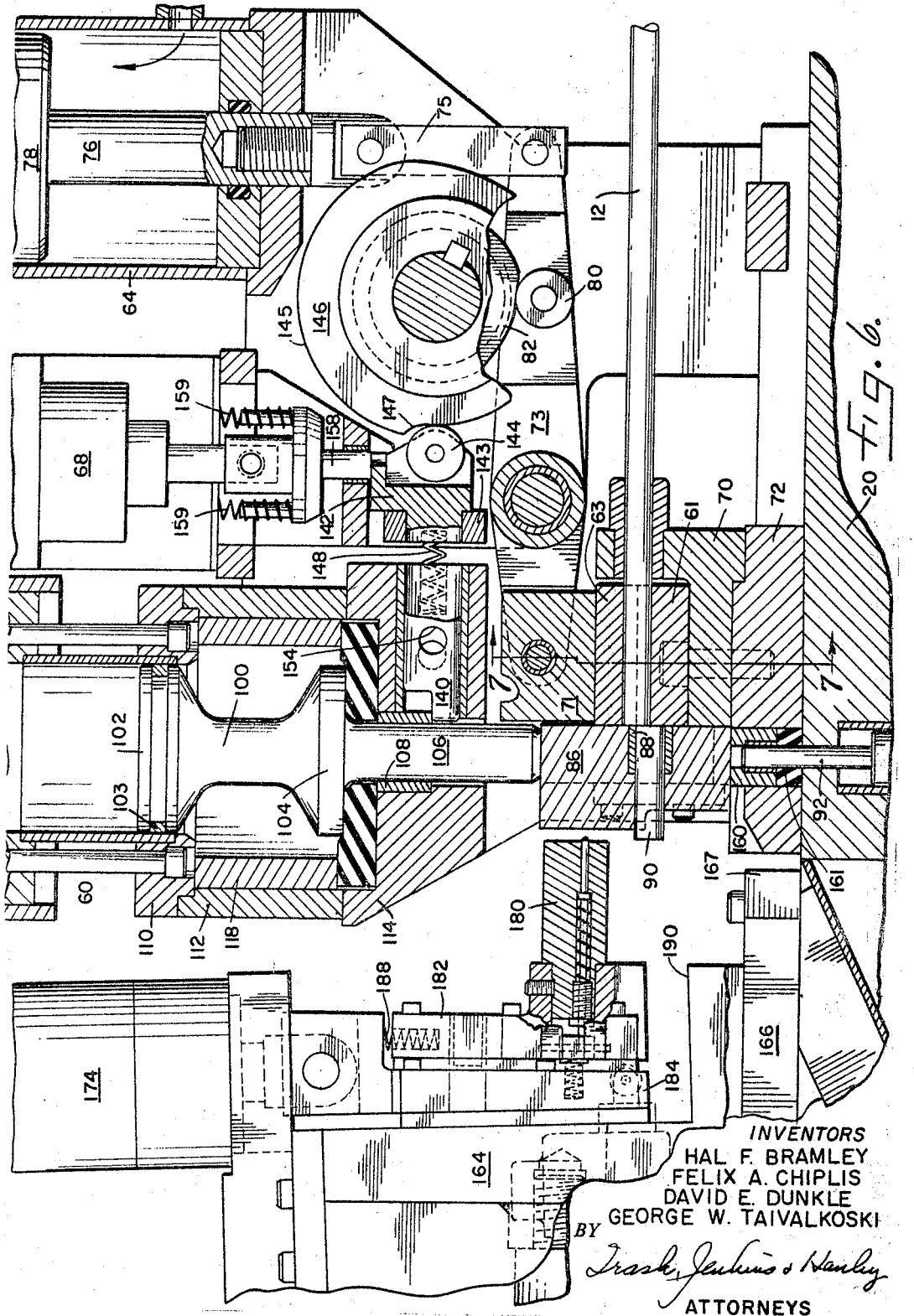

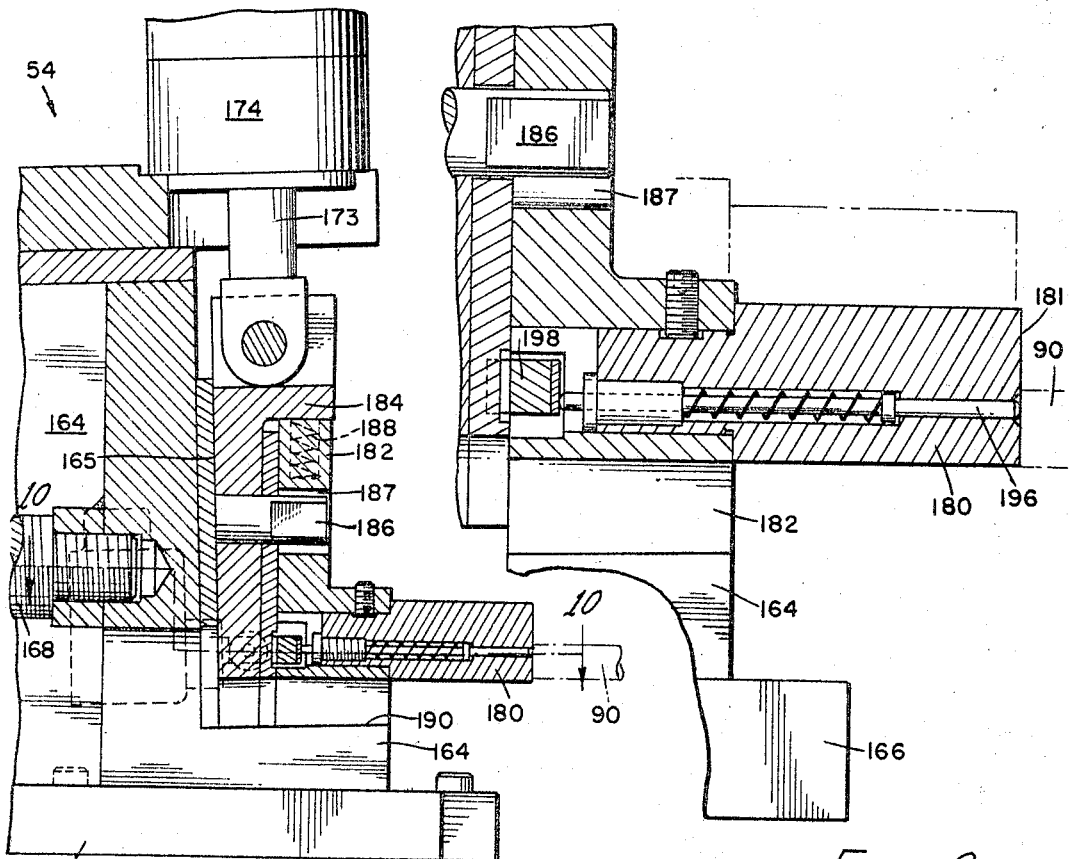
Fig. 8.
Fig. 9.
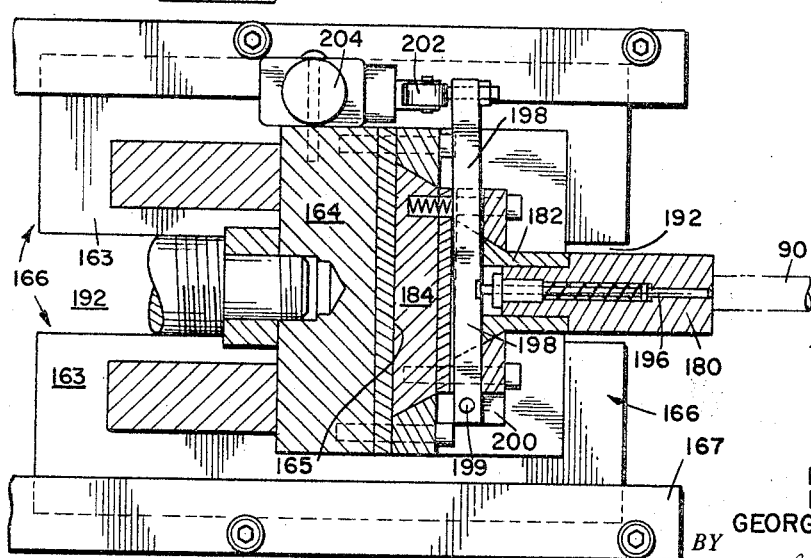
Fig. 10.
INVENTORS
HAL F. BRAMLEY
FELIX A. CHIPLIS
DAVID E. DUNKLE
GEORGE W. TAIVALKOSKI
BY
ATTORNEYS INVENTORS
HAL F. BRAMLEY
FELIX A. CHIPLIS
DAVID E. DUNKLE
GEORGE W. TAIVALKOSKI
BY

ATTORNEYS

United States Patent Office 3,452,572
Patented July 1, 1969

3,452,572
HIGH-VELOCITY SHEARING MACHINE
Hal F. Bramley, Felix A. Chiplis, and David E. Dunkle, Indianapolis, and George W. Taivalkoski, Plainfield, Ind., assignors, by mesne assignments, to Amsted Industries Incorporated, Chicago, Ill., a corporation of Delaware
Filed Feb. 27, 1967, Ser. No. 618,885
Int. Cl. B26d 1/06
U.S. Cl. 72—275                    22 Claims

ABSTRACT OF THE DISCLOSURE

A shearing die is actuated by impact of the stem of a free-piston ram accelerated to high velocity by gas in a pressure chamber openly connected to the ram piston cylinder. A wide stop shoulder on the arm, spaced from the piston and disposed in free space beyond the cylinder, engages a cushion supported about the ram stem to limit the ram stroke and absorb excess energy, which is held low by selection of ram and die weights and gas pressure. The operating cycle comprises (a) mechanically forcing the ram to retracted position against the gas pressure, as with cam-actuated push rods from beyond the die, (b) latching the ram retracted from the die while the push rods withdraw and stock is fed to eject the prior piece and to measure a new piece against an adjustable stock stop, and (c) releasing the ram for acceleration to high velocity impact with the die. Either the stock die or the piece die can be the movable die. The ram cylinder, die movement, push rods and main cam are arranged in line for efficient operation. The stock-stop has lost motion on a retractable wedge, to first back off, then withdraw. The shearing cycle is coordinated with the output of an intermittent draw-and-feed type wire drawer.

BACKGROUND OF THE INVENTION

This invention relates to a machine for performing high-velocity die shearing and like metal operations, and especially to a machine for cutting pieces from a continuous rod or the like by the high-velocity shearing method disclosed in U.S. Patent No. 3,273,434. The method of that patent is a true shearing operation in that the material to be cut is stressed in shear to the point of fracture in a shear plane between two die elements; and the method is characterized by the feature that the shearing operation is performed by relatively moving the dies at linear speeds well above those obtainable by conventional means and preferably at speeds of at least six to eight feet per second. Such high-velocity shearing of rod gives great improvement in the quality of the cut faces and ends of the cut pieces. The end faces are flatter and more nearly perpendicular to the rod axis and the ends show less deformation. Further, the high-velocity materially extends the range of application of shearing, to make shearing practical for larger sections and for less favorable materials, which have previously required either different cutting operations or additional forming operations to avoid the disadvantageous results produced by conventional shearing.

SUMMARY OF THE INVENTION

The present invention provides a versatile machine adapted to perform a variety of shearing or like metal-working operations at high cycling rates, adapted to give working velocities of the order of 25 to 50 feet per second and a corresponding range of energy levels, and to permit high-velocity shearing to be efficiently performed while retaining good control of excess energies of the tools and machine parts.

In accordance with the invention, a free-piston type ram is mounted with its piston portion in a short cylinder spaced from the dies and openly connected to a ram pressure chamber so that the ram is continuously urged toward the die area by gas pressure in the chamber. The ram is preferably spool shaped, with a radial flange spaced from the piston and forming a stop shoulder, and an impact stem or plunger extending toward the die. It may be guided for axial movement by the cylinder and by a guide engaging the plunger. The cylinder is open at both ends and the stop shoulder moves in free space outside the cylinder, so that ram acceleration is not opposed by back pressure. The stroke of the ram is limited by a cushion mounted above the die area and surrounding the ram plunger, in a position to be engaged by the ram stop shoulder.

The ram is mechanically retracted against the chamber pressure, as by push rods actuated by a ram-lift cam below the die area, and is latched in retracted position by a latch operated by a control cam.

The shearing dies include a stock die through which the stock extends, and a workpiece die which engages the piece to be cut. One of these lies in the path of the ram plunger and is movable, while the other lies on the opposite side of the searing plane from the movable die and is fixed. For cutting short workpieces, the stock die may be the fixed die and may be one which clamps the stock during the shearing operation. For cutting longer workpieces, we prefer to mount the workpiece die as the stationary die and to move the stock die. Among other things, this avoids whip of the unsupported end of a long workpiece when the die moves. The movable die is moved into alignment with the fixed die, as by mechanism actuated by spring pressure and retracted during the shearing step by a die-lift cam operated with the ram-lift cam.

With the dies in alignment, stock is fed through the dies against an adjustable stop which determines the length of the workpiece to be cut. The latch is then released to allow the ram to be driven into high-velocity impact with the movable die, to drive such die through a high-velocity shearing operation. The mass of the ram and the pressure of the gas in the ram pressure chamber are selected to give sufficient energy at high-velocity to perform the work required.

Only relatively short movement of the movable die is required, and die movement is limited by a cushion mounted in the path of the movable die.

The operating cycle is controlled in timed sequence by the cams and controls driven therewith.

The machine provides ram impact velocity over a wide range extending well above the minimum of six to eight feet per second called for by the method of Patent No. 3,273,434, and is especially adapted to provide ram impact velocity in the range of from 25 to 50 and more feet per second.

The machine is especially adapted to be fed directly from a wire or rod drawing machine of the intermittent draw-and-feed type. In the embodiment shown, it is combined with such a drawing machine, driven from a common power source and operated in timed relation.

The machine is operable at any desired cycling rate over a considerable range, since the high-velocity shearing step is both rapid and independent of the cycling rate. Accordingly, the cycling rate can be a high rate suitable for volume production. In combination with a wire drawing machine, the cycling rate is limited by the operating rate of the drawer. In one such combination, operating rates of the order of 50–70 cycles per minute and 110–130 cycles per minute are contemplated, depending on the stock size and piece length being cut.

The accompanying drawing illustrates the invention, and shows two embodiments thereof. In such drawings:

FIG. 6 is an enlarged partial section similar to FIG. 4 but showing the parts in positions after the shearing step, with the ram at the end of its stroke and the movable die in lowered position, generally as of the 115° point on the sequence diagram of FIG. 13;

FIG. 8 is a section similar to the left-hand portion of FIG. 6, showing the stock stop mechanism with the stop in lowered or operative position;

FIG. 9 is an enlarged section similar to FIG. 8, showing the stock stop in an intermediate position of retraction, that is, with the main slide raised sufficiently to take up the lost motion between it and the secondary slide carrying the stop bar;

FIG. 10 is a horizontal section taken on the line 10—10 of FIG. 8;

Figure 1:
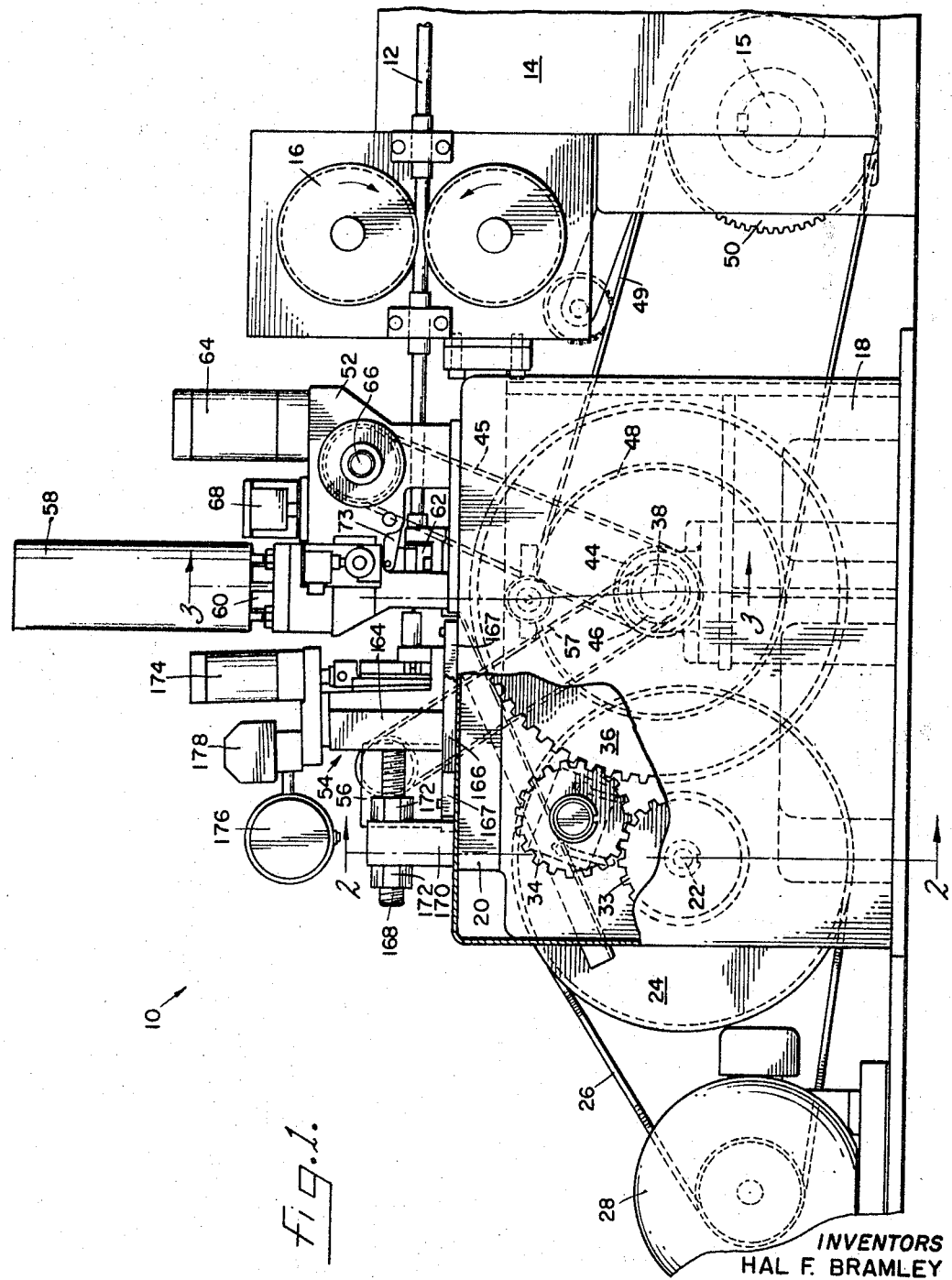
FIG. 1 is a side elevation of a shearing machine embodying the invention, in combination with a wire drawing machine connected to feed the shearing machine.

The machine of FIGS. 1–13 comprises a high-velocity shearing machine 10 for cutting measured lengths from the end of a stock wire or rod 12 fed to it by the feed rolls 16 of a wire drawer 14. The wired rawer 14 is of the known intermittent-cycle type in which a drawing die is moved through a rearward stroke along the stock while the stock remains stationary, and the stock and die are then advanced in preparation for another drawing stroke, and in which the output is an intermittent forward feeding of the stock rod 12. The stroke length of the die and the amount of stock fed forward at each cycle is adjustable. The drawer 14 has an input drive shaft 15 connected to be driven from a common power source with the shearing machine 10.

The shearing machine 10 comprises a machine base 18 forming a table 20 at its top and housing the main drive mechanism. An input drive shaft 22 journaled in the frame 18 carries a drive pulley 24 at one end which is connected by belts 26 to a motor 28. The drive pulley 24 houses an air-operated clutch 30, associated with a brake 32. The drive shaft 22 is normally held by the brake 32 and de-clutched from the pulley 24, and upon air actuation, is released from the brake and clutched to the drive pulley 24. The opposite end of the drive shaft 22 carries a drive gear 33 which, through an idler 34, drives a main gear 36 fixed on the main cam shaft 38. Such shaft 38 carries a ram-lift cam 40 and a die-lift cam 42, and two control-drive sprockets 44 and 46. The main shaft 38 also carries a drive sprocket 48 connected by a chain 49 to a sprocket 50 fixed on the drive shaft 15 of the wire drawer 14.

The table 20 of the machine base 18 supports a head frame 52 which carries the shearing mechanism. The table also supports a stop assembly 54, and a timing-switch device 56 driven by a chain 57 from the control sprocket 46.

THE SHEARING MECHANISM

Figure 2:
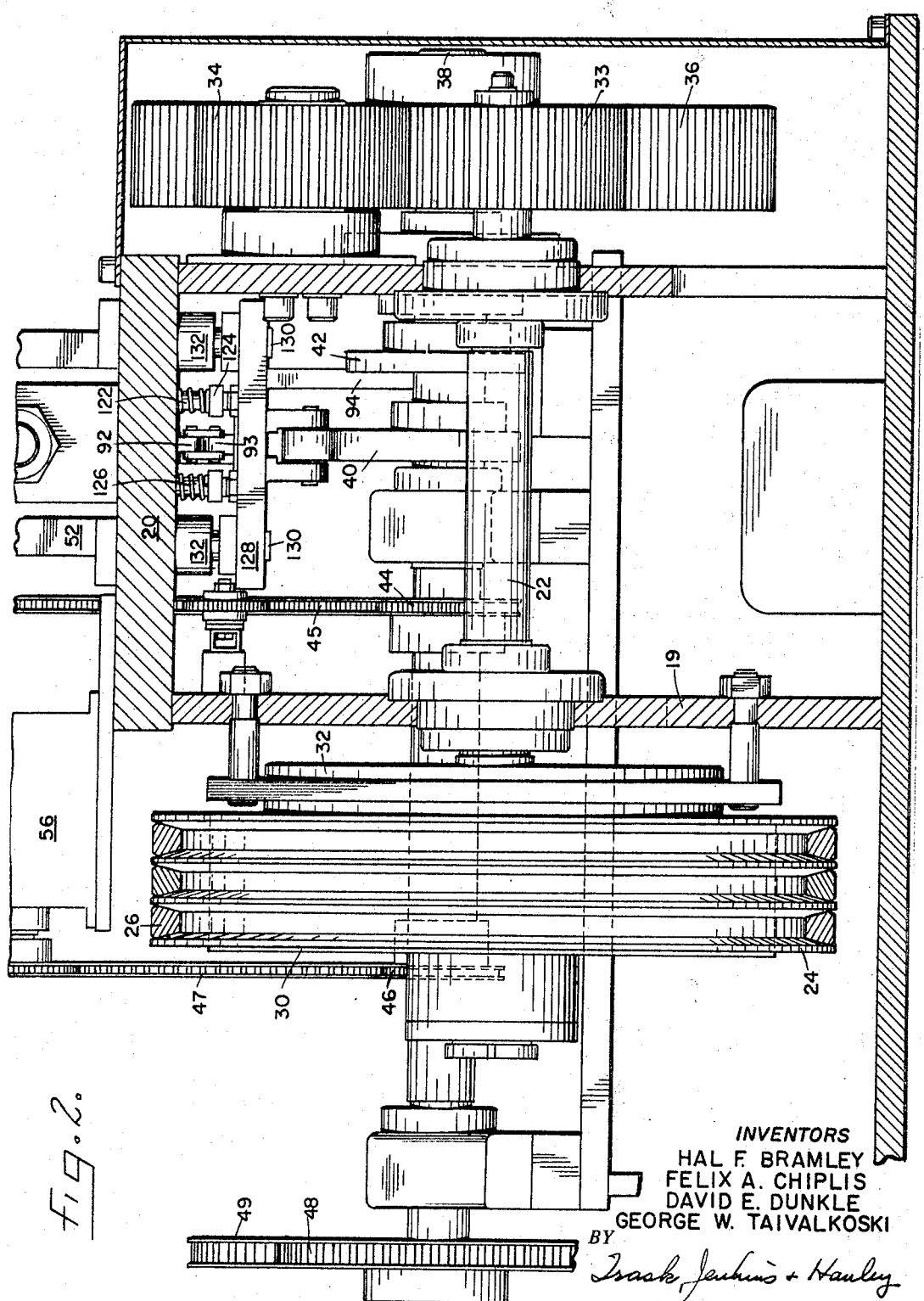
FIG. 2 is an enlarged sectional view taken on the line 2—2 of FIG. 1.

As shown in FIGS. 1–2, the shearing mechanism associated with the head frame 52 comprises a ram pressure chamber 58 which stands above a ram cylinder 60 in vertical alignment with the ram lift cam 40 and above a die area containing a movable workpiece die and a fixed stock die 62 of a type adapted to clamp the stock 12 during the shearing operation. The head frame 52 also carries a clamping cylinder 64 which acts through a lever 73 to apply pressure to the stock die 62. A control cam shaft 66 journaled in the head frame 52 controls the shearing operation, as described below, and is driven by a chain 45 from the control sprocket 44 on the main cam shaft 38. The head frame 52 also carries the release solenoid 68 for a normally-engaged lock-out device.

As more fully shown in FIGS. 3, 4, 6 and 7, the fixed stock die 62 is mounted in a die holder 70 carried by a tool base 72 mounted on the table 20. As shown in FIGS. 4–7, the fixed stock die 62 includes a fixed lower die member 61 and an upper stock-clamping member 63 adapted to be pressed downward by a pressure foot 71 carried at the end of the die clamp lever 73 which is pivotally mounted on a shaft 74 in the head frame 52. The rear end of the die clamp lever 73 is connected by a link 75 to the rod 76 of a piston 78 in the die clamp cylinder 64. Pressure beneath the piston 78 urges the piston upward to exert downward pressure on the clamping foot 71. A cam follower 80 on the die clamp lever 73 engages a die clamp control cam 82 on the control cam shaft 66.

Adjusting screws 84 (FIG. 4) hold the fixed die member 61 to the left in shearing relation with the movable die.

Figure 4:
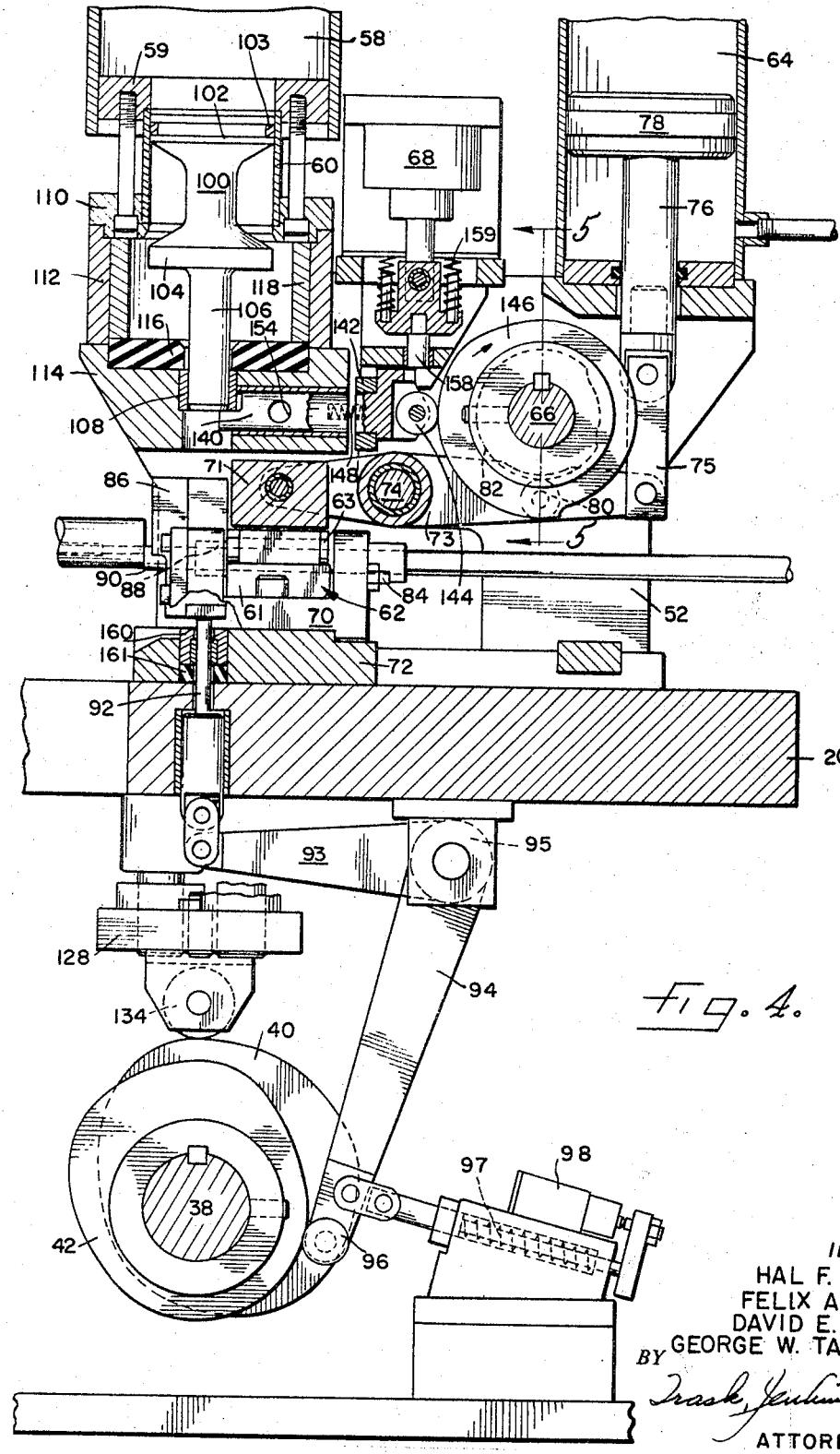
FIG. 4 is a partial vertical section taken on the line 4—4 of FIG. 3, showing the parts in positions prior to the shearing step and generally as of the beginning of the sequence diagram of FIG. 13.
Figure 5:
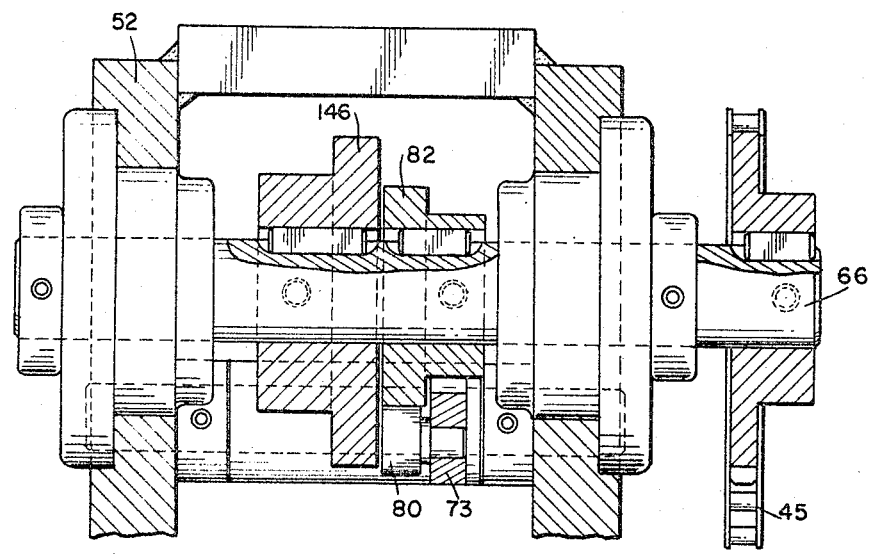
FIG. 5 is a vertical section taken on the line 5—5 of FIG. 4 and showing the control cam shaft.
Figure 7:
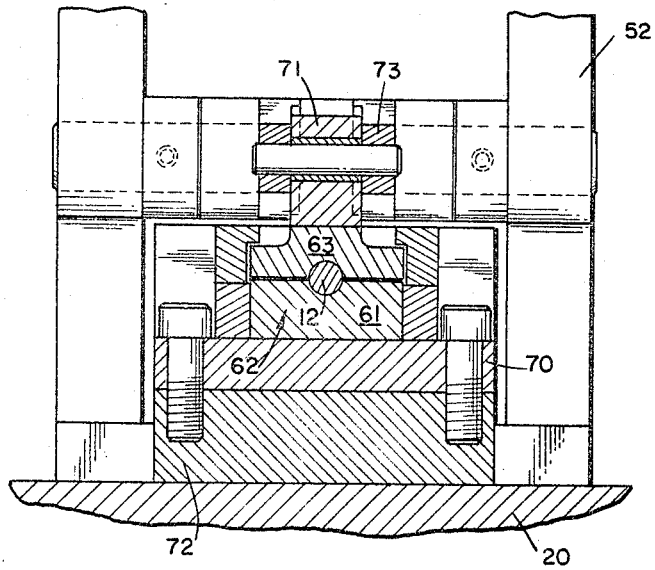
FIG. 7 is a section taken on the line 7—7 of FIG. 6 and showing the stock die and its clamping mechanism.

The movable workpiece die 86 is mounted in a vertical slide formed in the left end of the die holder 70. Such die is desirably lined with a wear sleeve 88 and defines a die opening to closely receive the workpiece 90 which is to be cut from the stock 12. The movable workpiece die 86 has a normal position in alignment with the fixed stock die 62, to which it is raised by a lift pin 92 operated by a lever and rocker shaft system 93–94–95, from the die lift cam 42 on the main cam shaft 38. As shown in FIG. 4, the pin 92 is linked to the arm 93 fixed on the rocker shaft 95, which is controlled by the arm 94 from the cam follower 96. The arm 94 and follower 96 are urged toward the cam 42 by a spring 97, and the spring acts in the direction to lift the pin 92, so that the force which lifts the die is the resilient force of the spring 97, while the cam 42 acts to positively retract the die-lift pin 92 against the force of the spring 97. Desirably, a checker switch 98 is operated from the lever arm 94, by a guide rod for the spring 97, and serves at a proper time in the operating cycle to check whether or not the movable die 86 is in raised position.

The movable die 86 is arranged to be actuated through a shearing stroke, from the position shown in FIG. 4 to the position shown in FIG. 6, by a ram 100 having a piston portion 102 vertically slidable in the ram cylinder 60 and driven downward by gas pressure in the ram pressure chamber 58. The ram 100 is desirably of hourglass or spool shape. Its upper end forms piston 102, grooved to receive a piston ring 103 to seal it to the ram cylinder 60. The lower end of the spool shape of the ram 100 forms a wide radial stop collar 104 which defines a downward-facing stop shoulder. A die-engaging plunger 106 extends axially downward from the stop collar 104 through a guide bearing 108. The ram is thus guided at its top by the piston 102 and at its lower end by engagement of the ram plunger 106 in the guide bearing 108.

The ram cylinder 60 is clamped between the lower header 59 of the ram pressure chamber 58 and a supporting end frame 110, and the entire area of the ram cylinder 60 is exposed at the top to the pressure chamber through a registering opening in the lower header 59. At the bottom, the cylinder is open to an enlarged chamber which provides free space for the travel of the collar 103 and avoids back pressure on the piston.

The end frame 110 is supported by a cylindrical spacer 112 above and from a heavy cross member 114 of the head frame 52. The upper face of the cross member 114 forms a cavity to receive a cushion 116 in position to be engaged by the stop shoulder of the ram and thereby to limit the downward stroke of the ram and absorb its excess energy. The cushion is conveniently held in place by a sleeve insert 118 extending between the upper face of the cushion 116 and the lower face of the end frame 110.

The ram cylinder and pressure chamber form a removable assembly which is bolted to the cross member 114 of the head frame 52 by bolts 120. It is readily convenient to replace such assembly and the ram with others of different dimensions and weights, and thereby to vary the mass of the ram 100 and the piston area exposed to the pressure in the ram pressure chamber, and thus to vary the accelerating force and the energy imparted to the ram.

Figure 3:
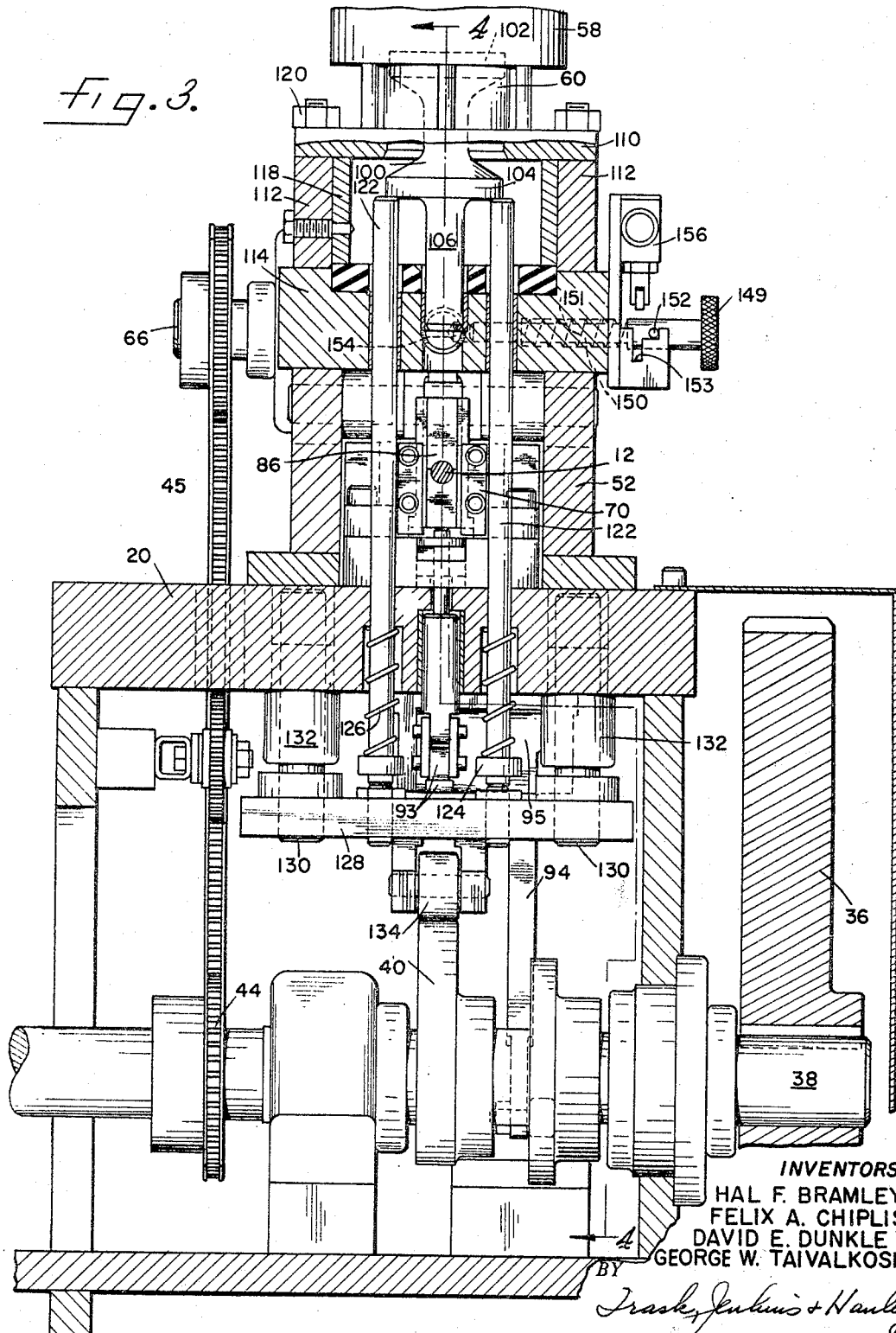
FIG. 3 is an enlarged partial section taken on the line 3—3 of FIG. 1 and generally in a plane containing the axis of the main cam shaft and the axis of the ram and its cylinder.

As shown in FIG. 3, the ram 100 is lifted to its raised position by a pair of push rods 122 which extend upward through the table 20 past the die holder 70 and through guides in the cross member 114 of the head frame 52. The push rods 122 have collars 124 at their lower ends and are spring pressed downward by springs 126. They are driven upward by a cross head 128 which is guided for vertical movement by a pair of guidepins 130 slidable in guides 132 mounted in the table 20. The cross head 128 carries a cam follower 134 which engages the ram lift cam 40.

When raised to elevated position by the push rods 122, the ram 100 is latched in raised position by a latch slide 140 slidably mounted in a bearing sleeve in the cross member 114 of the head frame 52. (See FIGS. 4 and 6). The rear end of the latch slide 140 is fixed to a yoke 142 which carries a cam follower 144 riding on the cam surface of a control cam 146 on the control cam shaft 66. The latch slide 140 is urged to the right towards the control cam 146 by a pair of springs 148 mounted in sockets in the cross member 114 and bearing rearwardly against lateral projections 143 on the yoke 142.

The latch slide 140 may be manually locked in latched position by inward movement of a lock-out pin 150, shown in FIG. 3. The pin is normally urged outward by a spring 151, and may be held in inward locking position by engagement of a cross pin 152 on its handle 149 with a slot 153 in an associated bracket. When pressed inward, the lockout pin 150 enters a hole 154 in the latch slide 140 to lock it against retraction from latching position. The cross pin 152 in the handle 149 projects in both directions from the shank of the handle, and when one end of such pin 152 is engaged in the notch 153, its opposite end engages the actuator of a lock-out switch 156 which is connected to energize a signal light indicating the machine is in lock-out position. The switch may also de-energize the clutch control circuit and inactivate the machine.

The latch slide 140 is also arranged to be normally locked against retraction by a control dog 158 which is urged downward by springs 159 to a locking position in the path of the yoke 142 of the latch slide 140 to prevent retraction motion of such slide. During normal operation of the machine, the control dog 158 is raised by the release solenoid 68, and held in the raised position shown in FIGS. 4 and 6.

When both the manual lock pin 150 and the control lock-out pin 158 are in retracted position, the operation of the latch slide 140 is controlled by the control cam 146. This rotates clockwise as seen in FIGS. 4 and 6 and is provided with a long land 145 which positively holds the latch slide in latched position. A cam step 147 allows the latch slide to move to unlatched position as shown in FIG. 6, and a diametrically opposite cam rise thrusts the latch slide 140 to latched position as shown in FIG. 4, all in suitable timed relation to the operating cycle as will be described below.

When the latch slide 140 retracts, the ram 100 is released and is rapidly accelerated downward by the gas pressure against its piston 102. It has a predetermined amount of free movement during which it attains a high velocity. The lower end of the die engaging plunger 106 then impacts the movable die at high velocity to impart energy at a high rate to that die to drive it through a shearing movement. Overtravel of the die is prevented, and excess energy of the die is absorbed by a die cushion 161 surrounding the lift pin 92. In the modification of FIGS. 1–12 the impact is taken by a metal impact sleeve 160 surrounding the lift pin 92, and transmitted therefrom to the underlying rubber cushion 161 supported by the table 20. The tool base 72 is cut away sufficiently to provide clearance for the impact movement of the die 86.

STOCK STOP

The stock stop mechanism 54 shown in FIG. 1 comprises a body 164 carried by a base 166 slidable between gibs 167 on the table 20. A threaded bar 168 projecting from the rear of the body 164 extends through a fixed anchor post 170 and is held in adjusted position with respect to such post 170 by a pair of nuts 172. The upper end of the body 164 carries a double acting stop control cylinder 174 which is connected for operation from an accumulator chamber 176 under the control of a solenoid valve 178.

Details of the stop mechanism are shown in FIGS. 6 and 8–10. The arrangement is such that the stop bar 180, during retraction, first moves slightly to the left, and is then lifted out of alignment with the stock 12 and workpiece 90. To this end, the bar 180 is mounted on a secondary slide 182 having lost-motion sliding movement on a wedge slide 184. The wedge slide is connected to the piston rod 173 of the cylinder 174. The front face of the stop body 164 is inclined at a slight angle, say 2° from the vertical, and the wedge is mounted for sliding movement against this face 165. The front face of the wedge slide 184 is vertical and slidably supports the secondary slide 182. Relative sliding movement between the wedge slide 184 and the secondary slide 182 is limited by a pin 186 fixed in the wedge slide 184 and received in an elongated opening 187 in the secondary slide 182. The secondary slide 182 is biased downward relative to the wedge slide 184 by a pair of compression springs 188 mounted in sockets in the upper end of the secondary slide 182.

When the parts are in their normal or stop position, both the slide 182 and the wedge slide 184 rest in abutting relation against a supporting face 190 formed on the base of the body 164, and the secondary slide 182 is at the upper-most limit of its movement relative to the wedge slide 184. When the stop control cylinder 174 is actuated to lift the piston rod 173, its first movement lifts the wedge slide 184 through its lost motion relative to the secondary slide 182 which remains seated on the face 190 by reason of the downward pressure of the springs 188. Such limited lost motion withdraws the wedge relative to the secondary slide 182 and causes the stop 180 to back off slightly to the left. This relieves the pressure between the stop bar 180 and the workpiece 90, and further upward movement of the wedge slide 184 then carries the secondary slide 182 with it to raise the stop bar 180 out of alignment with the workpiece 90 to the position shown in FIG. 6.

As may be seen in FIG. 10, the base 166 of the body 164 is formed of two spaced members 163 so that there is clearance space 192 between them for the ejection of the workpiece 90 from the machine. Likewise, the lower ends of the slides 184 and 182 are cut away at their midportions, immediately beneath the stop bar 180, to provide similar clearance.

For machine control purposes, the stop bar 180 desirably contains a probe pin 196 mounted in a bore in the stop bar 180 and spring pressed to the right, to a position in which the end of the probe pin 196 projects slightly from the stop face 181 of the stop bar 180. The rear end of the probe pin 196 engages a lever 198 pivoted by a pivot pin 199 on ears 200 carried by the wedge slide 184. The lever extends transversely through an opening in the parts to a position for engagement with the actuating member 202 of a stock-checker switch 204. When stock is in abutting relation with the stop face 181 of the stop bar 180, the probe pin 196 is actuated to the left and acts through the lever 198 to actuate the switch 204. The checker switch may be a normally closed switch which is opened by a stock actuation of the probe pin 196. A checker circuit may be momentarily closed through the checker switch at the end of the feeding step, and connected to actuate a cut-out relay. If the checker switch has not been opened, the cut-out relay will be actuated to de-clutch or otherwise stop the machine.

PNEUMATIC SUPPLY

Figure 11:
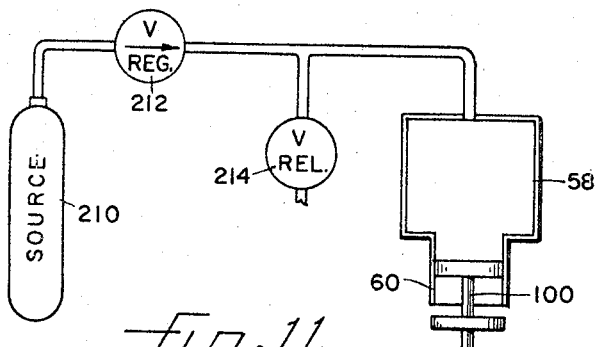
FIG. 11 is a pneumatic diagram of the ram cylinder and its gas supply.

As shown in FIG. 11, the ram pressure chamber 58 is connected to a source 210 of air or gas under high pressure, through a regulating valve 212 by which the chamber pressure may be adjusted to that needed to apply the desired force on the ram 100 in the ram cylinder 60. A pressure relief valve 214 is desirably connected to the supply line. The chamber size is desirably large relative to the ram piston displacement, to minimize pressure change during the ram stroke.

Figure 12:
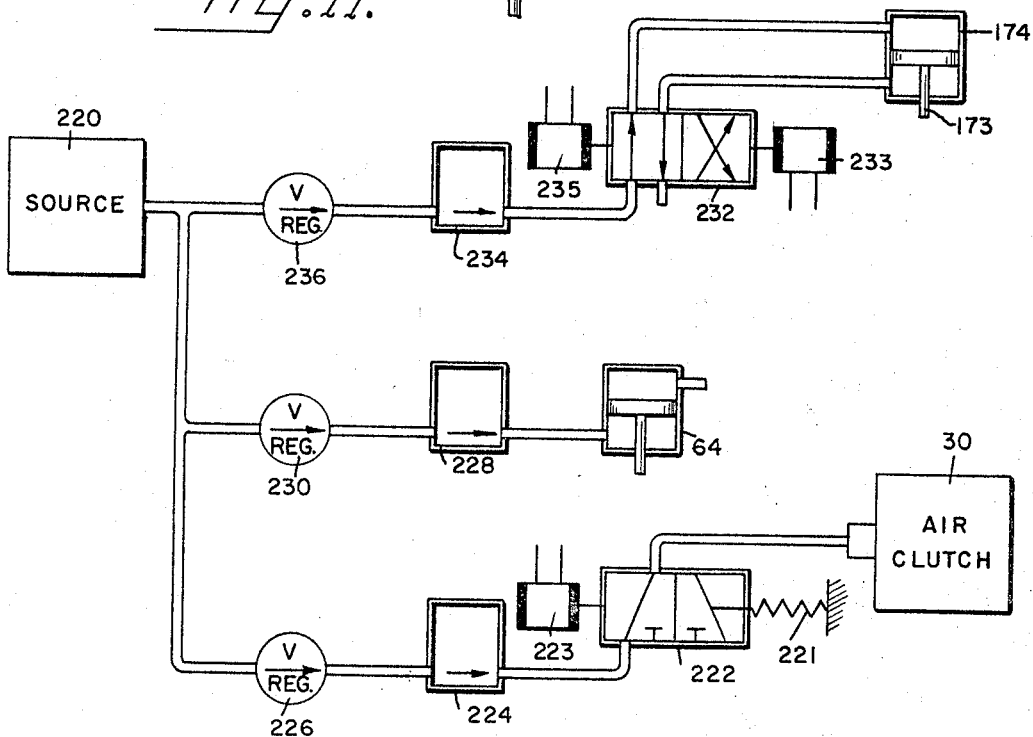
FIG. 12 is a pneumatic diagram showing the air supply for the stock stop cylinder, the die clamp cylinder, and the air clutch.

As shown in FIG. 12, a single source 220 supplies other pneumatic pressure requirements. The air-operated clutch 30 is connected through a control valve 222, an accumulator 224, and a regulating valve 226 to the source 220. The valve is biased to "OFF" position by a spring 221 and is moved to "ON" position, as shown, by a solenoid 223.

The lower end of the die clamp cylinder 64 is connected through an accumulator 228 and a regulating valve 230 to the source supply source 220.

The stock stop control cylinder 174 is a double acting cylinder, and is connected through a reversing valve 232, an accumulator 234, and a regulating valve 236 to the supply source 220. The valve 232 is arranged to remain fixed in either of its two positions. When drawn to the right by the solenoid 233, the valve connects the cylinder for downward movement of its piston and rod 173. When actuated to the left by the solenoid 235, the valve connects the cylinder for upward actuation of its piston and rod 173.

OPERATION OF FIRST MODIFICATION

Figure 13:
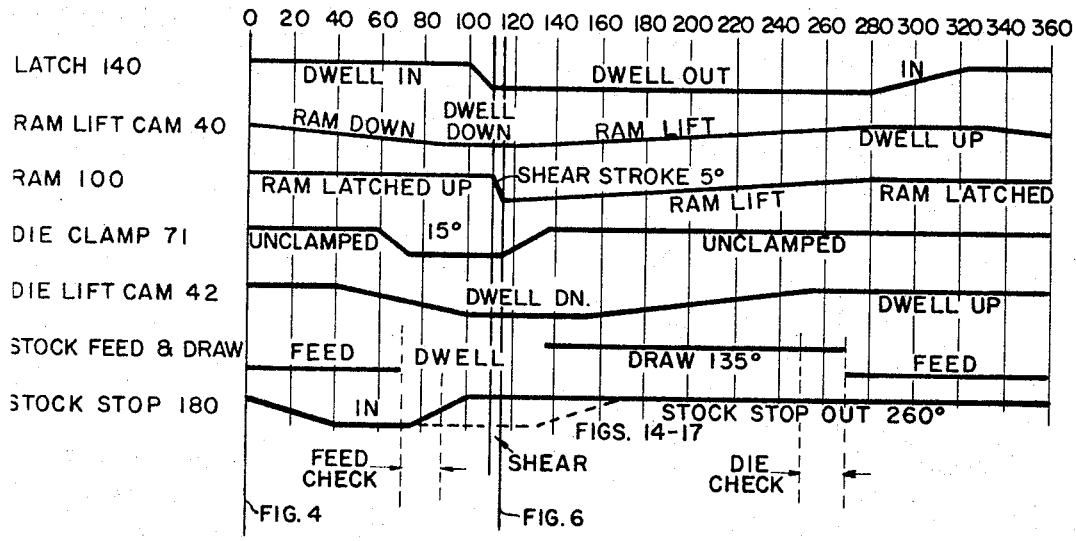
FIG. 13 is a timing diagram showing the operating sequence of the modification of FIGS. 1–12.

The machine above described is provided with suitable operating controls to produce an operating cycle shown in the diagram of FIG. 13.

As the diagram starts, at 0°, the stock 12 is being fed. The stop "in" solenoid 235 has been actuated immediately prior to the 0° position and the stock stop moves downward to its operative position to stop the forward movement of the stock 12 as its end strikes the stop bar 180. At the 60° point, the die clamp cam 82 allows the die clamp cylinder to rock the lever 73 and press the foot 71 against the upper stock die half 63 to clamp the stock in the die 62. The stock stop "out" solenoid 233 is then actuated to withdraw the stop 180 to the elevated position shown in FIG. 6, to avoid engagement with the workpiece 90 as it is sheared. Meanwhile, the ram lift cam 40 has acted to lower the push rods 122, leaving the ram supported by the latch 140. The die lift cam 42 has acted to lower the die lift pin 92 away from the movable die 86 to leave that die supported on the stock 12. At 100°, the latch 140 is released by the cam 146 for retraction by its biasing springs 148, the cam 146 having rotated to the position shown in FIG. 6.

The latch releases the ram at about 110° and the ram is then driven downward by the pneumatic pressure against the upper face of the ram piston 102. The ram is rapidly accelerated through its free travel to a high velocity and it then strikes the movable die 86. It imparts to the die 86 sufficient energy, at high velocity, to produce the desired high-energy-rate shearing action, and the die moves to the position shown in FIG. 6. The shearing is completed in a very short period of time.

The downward stroke of the ram is limited, and excess energy of the ram is absorbed, by the cushion 116 as it is engaged by the ram stop collar 104. The downward movement of the movable die 86 is limited, and excess energy of the die is absorbed, by the die cushion 161.

Immediately after the shearing stroke, and beginning at about 115°, the die pressure foot 71 is raised by the die clamp cam 82 to unclamp the stock. The ram lift cam 40 and the die lift cam 42 then act to raise the push rods to force the ram to its cocked position and to raise the movable die 86 to its normal position of alignment with the fixed die 62. Meanwhile, the wire drawer 14 operates to draw another length of stock. This is completed by about 270° point, and the wire drawer then feeds the stock forward for a new cycle. Immediately prior to such feeding, a checker circuit may be closed through the die checker switch 98. The circuit is such that if the switch is not in its die-raised position as shown in FIG. 4, the circuit will actuate a cut-out relay to stop the machine.

While the ram is held raised by the push rods, the latch control cam 146 moves the latch 140 to its latching position, and the ram-lift cam 40 and die-lift cam 42 then back away in preparation for a new cycle.

The mass of the ram 100, the pressure in the ram pressure chamber 58, and the mass of the movable die 86, will be selected to provide sufficient total energy to the die 86 to perform the shearing operation on the stock 12, and the values selected will vary with the cross section and strength characteristics of that stock 12. Values will also be chosen to provide for the application of that energy at a high rate, sufficient to produce the improved shearing results described in Patent No. 3,273,434. Excess energy is desirably held to a low value. We have used a range of values for these several variables, as indicated in the following table:

TABLE

| Stock rod diameter (inches) | Air pressure (p.s.i.) | Ram piston diameter (inches) | Ram weight (lb.) | Impact velocity (ft./sec.) | Die weight (lb.) |
| --- | --- | --- | --- | --- | --- |
| ⅜ (short) | 150 | 2 | 2.7 | 40.5 | 0.95 |
| ⅜ (long) | 139 | 2 | 2.7 | 39.0 | 1.75 |
| ⅜ | 56 | 2.957 | 5.3 | 25.0 | 3.00 |
| ⁷⁄₁₀ (short) | 224 | 2 | 2.7 | 49.5 | 1.07 |
| ⁷⁄₁₀ (long) | 207 | 2 | 2.7 | 47.5 | 1.84 |
| ⁷⁄₁₀ | 90 | 2.957 | 5.3 | 31.0 | 3.00 |
| ½ (short) | 224 | 2.5 | 3.8 | 52.0 | 1.22 |
| ½ (long) | 198 | 2.5 | 3.8 | 49.0 | 2.10 |
| ½ | 133 | 2.957 | 5.3 | 38.0 | 3.00 |
| ⁹⁄₁₆ (short) | 209 | 3 | 5.3 | 51.0 | 1.90 |
| ⁹⁄₁₆ (long) | 192 | 3 | 5.3 | 49.0 | 2.80 |
| ⁹⁄₁₆ | 192 | 2.957 | 5.3 | 45.0 | 3.00 |

In the foregoing table, the first two lines of values for each stock size are for the modification of FIGS. 1–13, which had a ram stroke of 1¾ inches. The last line of values for each stock size are for a machine as shown in FIGS. 14–17 and described below, which had a ram stroke of 1½ inches. Note that in the last lines the ram weight and die weight are the same for all sizes and the air pressure is varied to give different velocities.

Desirably, for ram impact velocities of 25–50 feet per second the ram weight is of the order of 1½ to 3 times the weight of the movable die.

SECOND MODIFICATION

The modified machine shown in FIGS. 14–17 differs from that of FIGS. 1–13 primarily in that the stock die is the movable die instead of the workpiece die being the movable die. The machine is of the same general construction as that of FIGS. 1–12, and has the same base frame 18 and table 20. A head frame 252 mounted on the table 20 supports a ram cylinder 260 and a ram pressure chamber 258. A ram 300 is mounted with its piston portion 302 in the cylinder 260 and comprises an impact collar 304 and a plunger 306. The ram is lifted by push rods 322 interconnected by a cross head 328 operated by a cam follower 334 in engagement with a ram-lift cam 240.

Figure 17:
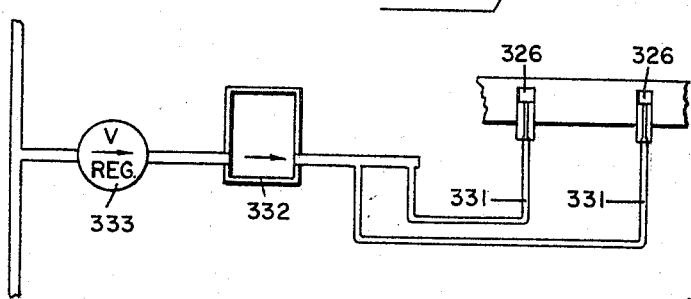
FIG. 17 is a pneumatic diagram showing the air supply for push-rod biasing cylinders of the modification of FIGS. 14–16.
Figure 14:
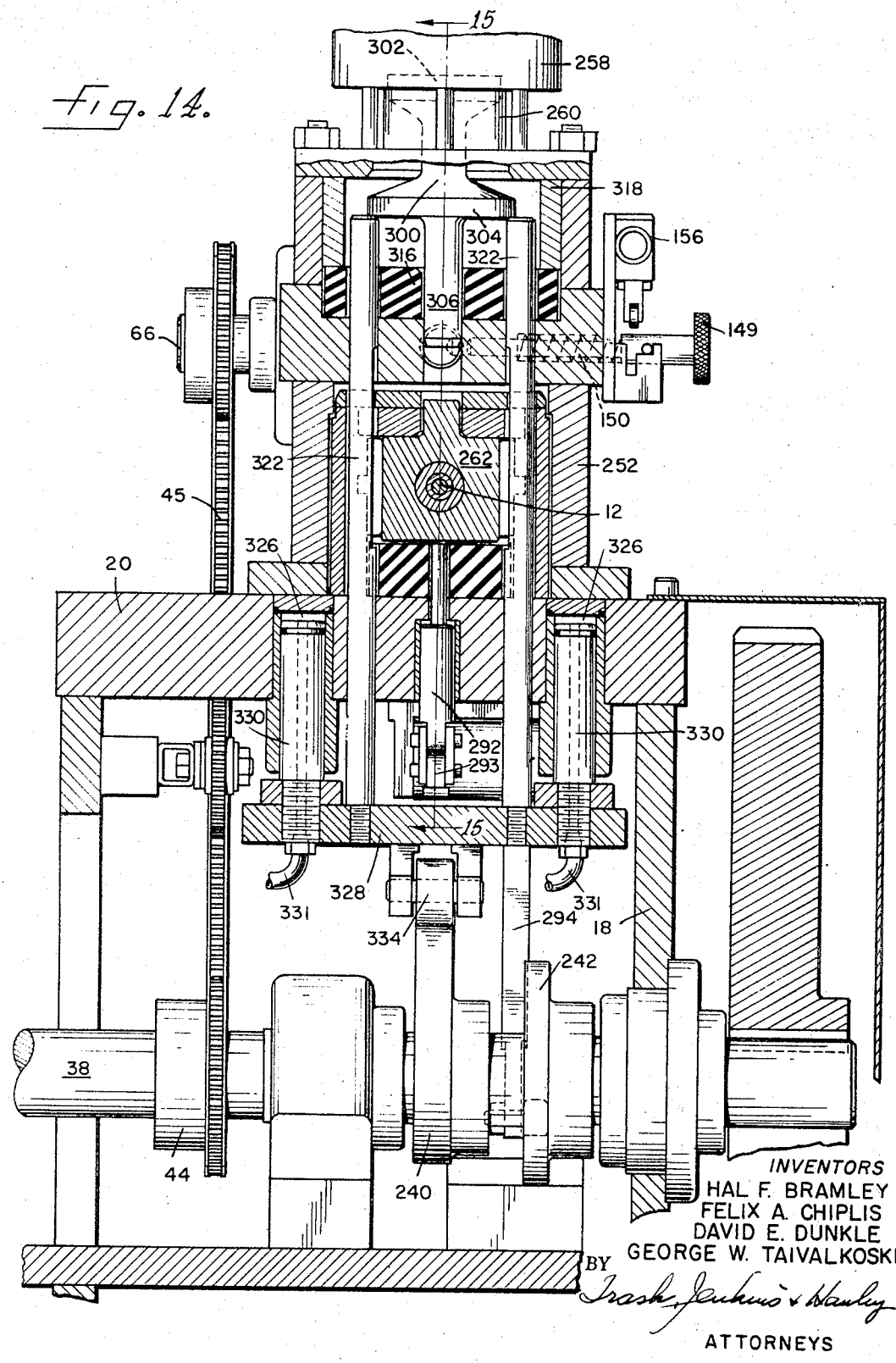
FIG. 14 is a transverse sectional view similar to FIG. 3, taken on the line 14—14 of FIG. 15, and showing a modification in which the stock die is movable and the piece die is fixed, and which embodies certain other differences.

In this modification, as shown in FIG. 14, the push rods 322 are fixed to the cross head 328 instead of being spring pressed downward. The cross head 328 is biased downward by air pressure in chambers 326 formed above the guide pins 330 carried by the cross head 328. Air passages to the chambers are formed by bores in the guide pins 330 and are connected at their lower ends to air supply hoses 331, an accumulator and supply source as shown in FIG. 17. The cross head and push rods are thus constantly urged downward and are lifted by the cam 240. A die lift pin 292 is operated by levers 293 and 294, actuated by a die-lift cam 242.

In this modification, the ram cushion 316 is thicker than that in the first modification, the cushion-retaining sleeve 318 is correspondingly shorter, and the ram has a somewhat shorter stroke. The same ram latch mechanism is used, comprising the latch slide 140, the control cam follower 144, the control cam 146, the manual lock-out pin 150 and the control lock-out dog 158.

In the modification of FIGS. 14–17, the shearing die set comprises a workpiece die 286 which is a solid die fixed to the tool base 72. The body of the die 286 contains a die bushing 287, lined with a wear sleeve 288 having an opening sized to closely fit the stock 12.

The die set also includes a stock die 262, which is the movable die. This comprises a body having a die bushing 263 lined with a wear sleeve 264. The stock die 262 is mounted for vertical movement through a shearing stroke, and is pressed toward the fixed die 286 by a back-up plate 266, held against the movable die by a set of adjustable thrust pins 268 and by springs 269. The die bushings 287 and 263 abut in the shear plane. The back-up plate 266 has an enlarged central opening through which the stock 12 extends, so that the die end of the stock is free to move with the movable die 262 during the shearing stroke. The stock is fed to the machine from a wire drawing machine or other supply and extends in unsupported state for a considerable length between the last guide 317 of the supply device and the movable die, over which length it is free to flex as the die moves through its short shearing stroke. However, since both ends of the free length are held, no undesirable whip occurs.

Figure 15:
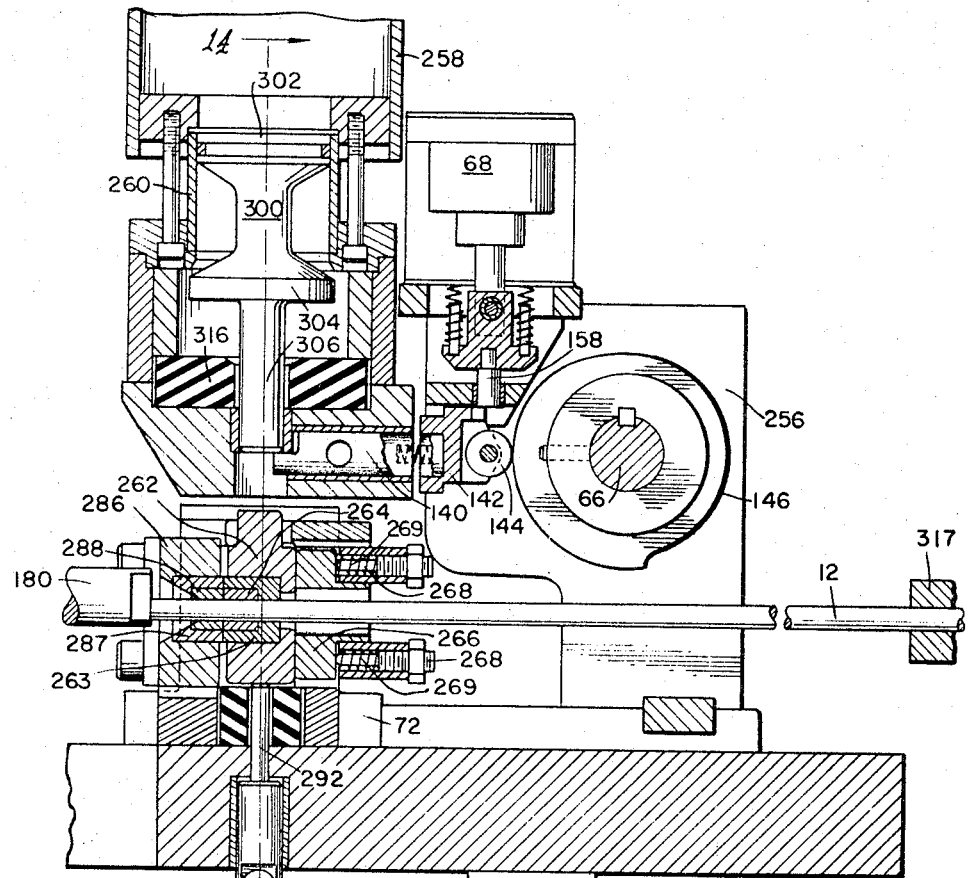
FIG. 15 is a longitudinal sectional view similar to FIG. 4 taken on the line 15—15 of FIG. 14.

In FIG. 15 the parts are shown in positions prior to shearing, corresponding to those of FIG. 4 and generally to the zero position of the cycle diagram of FIG. 13—except that the stock is shown fully advanced against the stop 180. From these positions, when the latch 140 is retracted, the ram 300 is driven downward by the gas pressure, which accelerates it to high velocity impact with the movable die 262 to actuate such die through a shearing stroke, to the position shown in FIG. 16. This shears the workpiece 290 from the stock 12, and leaves such workpiece in the fixed die 286, to be ejected at a subsequent point in the operating cycle.

Since both dies are solid dies in this modification, the die clamp mechanism of the machine of FIGS. 1–13 is unnecessary and is omitted.

Figure 16:
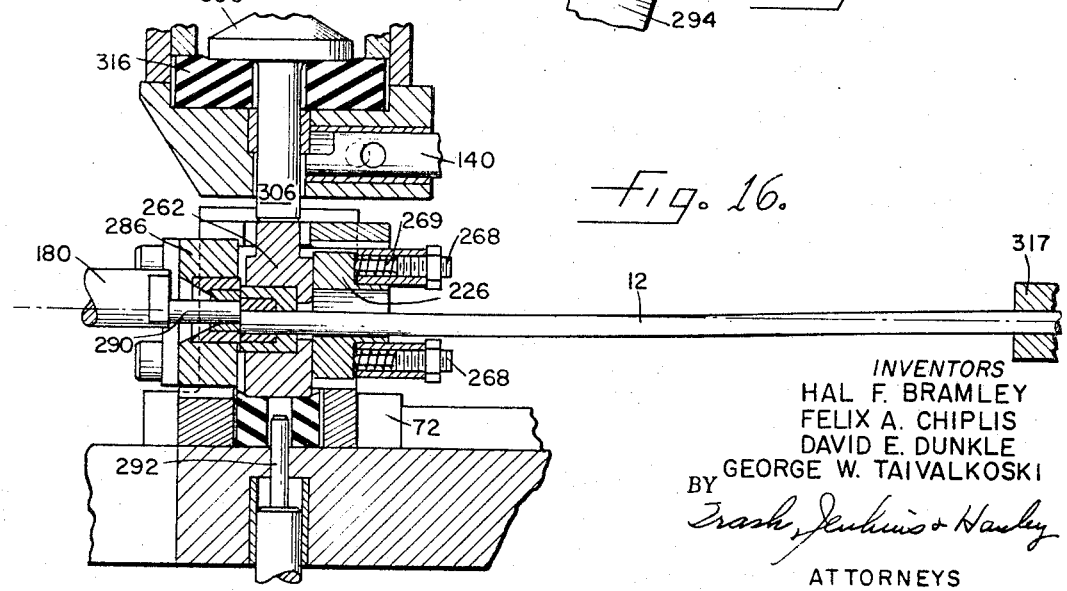
FIG. 16 is a partial section similar to FIG. 15, showing the parts in the positions at the end of the shearing operation.

The pneumatic system for the machine of FIGS. 14–16 is the same as that shown in FIGS. 11 and 12 except that the die clamp cylinder 64 and its accumulator 228 and regulator 230 are omitted, and other elements are provided to supply the pressure chambers 326 above the guide pins 330 of the ram lift mechanism. Such additional supply elements are shown in FIG. 17. The two cylinders 326 are connected by their flexible hoses 331 to an accumulator 332 which is supplied through a pressure regulator 333 from the supply source 220.

Operation of the modification of FIGS. 14–17 corresponds to that of the modification of FIGS. 1–13 as described in connection with the operating cycle diagram of FIG. 13, with two exceptions. The first exception, as noted above, is that there is no die clamp 71. The second exception is that the stock stop 180 is left in down or stop position during the shear stroke, so that the workpiece 290 is held by such stop 180 during the shearing step. In other machines, removal of the stop prior to shearing was considered desirable to avoid any possibility that the workpiece would weld itself back to the stock 12 at the end of the shearing. But this is not necessary under all shearing conditions. Accordingly, as indicated in dotted lines in FIG. 13, in this modification the stock stop 180 is shown as staying in the "IN" position through the shear stroke and as retracted at a later time in advance of the feed movement of the stock.

We claim:

1. A high-velocity shearing machine for cutting workpieces from stock material, comprising:
   a die support,
   a stock die for engaging the stock at one side of a shear plane,
   a workpiece die at the other side of the shear plane, for engaging a section of stock to be sheared from the stock,
   said dies having a normal aligned position permitting stock feed through them, and one of said dies being movable in shearing relation with the other through a short shearing stroke on a line transverse to the plane of the stock,
   a ram cylinder mounted coaxial with said line and spaced from said movable die,
   a ram pressure chamber to which the outer end of the ram cylinder is openly connected, adapted to contain gas under elevated pressure,
   a free piston ram having a piston portion in said cylinder exposer to such elevated pressure, a stop shoulder on said ram facing toward said movable die, and a coaxial plunger extending between said shoulder and movable die to transmit ram impact thereto to drive the die through its shearing stroke,
   a ram cushion supported in the path of the ram stop shoulder to limit advance movement of the ram,
   a die cushion supported in position to limit stroke movement of the movable die, latch means to latch the ram in a cocked position retracted from the movable die, means for moving the ram against the gas pressure to its said cocked position and for restoring the movable die to its normal position, and operating control means, said machine being operable to effect a repetitive shearing cycle in which (a) said ram is cocked and dies aligned for stock feed, and (b) said ram is unlatched and driven by said gas pressure into high-velocity impact with the movable die to drive it through a high-energy-rate shearing stroke.

2. A shearing machine as set forth in claim 1, in which said ram imparts to the movable die a velocity of at least 6 to 8 feet per second and sufficient energy to perform the shearing operation.

3. A shearing machine as set forth in claim 1, in which said ram has a mass of the order of from 1½ to 3 times the mass of the movable die, and the ram is accelerated to a die impact velocity of the order of 25 to 50 feet per second with sufficient energy to perform the shearing operation.

4. A shearing machine as set forth in claim 1, in which said stock die is movable and said piece die is fixed.

5. A shearing machine as set forth in claim 1, in which said piece die is movable and said stock die is fixed.

6. A shearing machine as set forth in claim 5 in which said fixed stock die comprises a fixed stock-supporting member and a clamp member, with the addition of means operated in timed sequence with the shearing cycle for clamping said clamp member against the stock during the shearing operation and releasing it during the feeding portion of the cycle.

7. A shearing machine as set forth in claim 1 in which said ram is of spool shape comprising the piston portion at its outer end and a radial flange spaced from the piston portion and forming said stop shoulder.

8. A shearing machine as set forth in claim 7 in which said ram also includes a plunger stem which extends through the ram cushion, and guide means engaging the stem and cooperating with the cylinder to guide the ram for axial movement.

9. A shearing machine as set forth in claim 1 in which said means for moving the ram to cocked position comprises a push rod extending parallel to the ram axis, past the movable die, having a ram engaging portion which engages the ram stop shoulder, and mechanical means on the opposite side of the die for advancing said push rod to move the ram to cocked position and for withdrawing the push rod before the ram is unlatched for its shearing stroke.

10. A shearing machine as set forth in claim 9, in which the movable die stroke and ram travel are vertical, the die support comprises a base frame forming a die-supporting table, the ram cylinder is supported above the table, and the mechanical means for operating the push rods comprises a ram-lift cam mounted below the table.

11. A shearing machine as set forth in claim 9, in which the mechanical means for operating the push rods comprise a ram-lift cam and follower, and the means for restoring the movable die to normal position comprises a die-lift cam operated in timed sequence with said ram-lift cam.

12. A shearing machine as set forth in claim 9, in which the ram cocking means comprises a pair of push rods engaging diametrically opposite portions of the ram stop shoulder, and said push-rod operating means comprises a yoke and cam follower mounted for movement in line with the axis of the ram, and a ram-lift cam actuating said follower.

13. A shearing machine as set forth in claim 1, for cutting piece lengths from elongated stock, with the addition of the stock feeding means and a stock stop to predetermine the piece length fed through the shearing plane.

14. A shearing machine as set forth in claim 13, in which said stock stop is movable, and means to move the stop out of the ejection path of a piece cut on one cycle before stock feed begins for a new cycle, and to move the stop into the stock feed path after ejection of the previously cut piece and before feeding of a full piece length for the new cycle.

15. A shearing machine as set forth in claim 13 in which said stock stop comprises a support body, a main slide slidable on said body transversely of the stock feed axis, and a stop member mounted on said control slide and having limited lost motion relative thereto, the lost motion between said slide and member having a component of movement relative to the body, in a direction parallel to the stock feed axis, the parts being so constructed and arranged, that initial withdrawal movement of the slide carries it through such lost motion relative to the stop member to move the stop member through said parallel component in the direction away from the stock, to back off the stop member from the stock, and further withdrawal movement of the slide carries the backed-off stop member transversely out of alignment with the stock axis.

16. A shearing machine as set forth in claim 1, in combination with a stock drawing machine having an operating cycle in which drawing occurs intermittently while the stock is held, alternately with stock feed movements, the stock delivered by the drawing machine being fed directly to the shearing machine, said shearing machine control means being coordinated with the drawing machine cycle, and said shearing machine being operable to cock the ram and align the dies between feeding movements of the drawing machine.

17. The combination set forth in claim 16 with the addition of a stock stop on the shearing machine operative to stop stock delivery from the shearing machine when predetermined lengths of stock have been fed.

18. A shearing machine for cutting measured lengths from elongated stock, comprising:

shearing dies operable to cut the stock in a shearing plane, means to feed the stock axially through the shearing plane against a stop, stock stop mechanism having a support body, a main slide slidable on said body transversely of the stock feed axis, and a stop member mounted on said control slide and having limited lost motion relative thereto, the lost motion between said slide and member having a component of movement relative to the body, in a direction parallel to the stock feed axis, the parts being so constructed and arranged, that initial withdrawal movment of the slide carries it through such lost motion relative to the stop member to move the stop member through said parallel component in the direction away from the stock, to back off the stop member from the stock, and further withdrawal movement of the slide carries the backed-off stop member transversely out of alignment with the stock axis.

19. A shearing machine as set forth in claim 18 in which said main slide forms a wedge between the support body and the stop member, and the stop member is slidable in said lost motion on the wedge, and said initial retraction movement of the main slide partially withdraws the wedge from between the body and stop member to effect back-off movement of the stop member from the stock.

20. A machine for performing high velocity shearing and like metal-working operations, comprising a set of operating dies adapted to be actuated by impact of a high velocity ram, a ram cylinder mounted in line with the center line of die-actuating impact, a ram pressure chamber to which the outer end of the cylinder is openly connected, adapted to contain gas under elevated pressure, a free piston ram having a piston portion in said cylinder, exposed to such gas, a stop shoulder on said ram facing in the direction of die impact, a coaxial plunger between said shoulder and dies to transmit ram impact thereto, a pair of push rods positioned to engage said shoulder at opposite eccentric points, means to actuate said push rods to move said ram to a cocked position retracted from said dies, and then withdraw the rods to a ram clearance position, means to latch said ram in cocked position while the rods are withdrawn and then to release the ram for acceleration by said gas under pressure to high velocity impact with said dies.

21. A shearing machine as set forth in claim 20 with the addition of a ram cushion supported between the ram shoulder and said dies to limit advance movement of the ram, said rods moving through the plane of the cushion to cock the ram and withdrawing beyond the impact face of the cushion for ram clearance.

22. A shearing machine as set forth in claim 21 in which said plunger is integral with the ram and extends through the plane of the ram cushion, and guide means engaging the plunger and cooperating with the cylinder to guide the ram for axial movement.

References Cited

UNITED STATES PATENTS

| | | | |
|---|---|---|---|
| 2,404,901 | 7/1946 | Cibs | 83—188 X |
| 2,861,486 | 11/1958 | Brauer | 72—435 |
| 3,187,548 | 6/1965 | Murek | 72—435 |

FOREIGN PATENTS

| | | |
|---|---|---|
| 419,111 | 9/1925 | Germany. |

JAMES M. MEISTER, *Primary Examiner.*

U.S. Cl. X.R.

72—435; 83—63, 181, 198, 267, 587, 639; 173—134

PO-1050
(5/69)

UNITED STATES PATENT OFFICE
CERTIFICATE OF CORRECTION

Patent No. 3,452,572           Dated July 1, 1969

Inventor(s) H. F. Bramley et al

It is certified that error appears in the above-identified patent and that said Letters Patent are hereby corrected as shown below:

Column 1, line 17, change "arm" to -- ram --.
Column 2, line 31, change "searing" to -- shearing --.
Column 3, line 68, change "rawer" to -- drawer --.
Column 9, in each of lines 7, 8, and 9
of the TABLE, change "7/10" to -- 7/16 --.

SIGNED AND
SEALED
MAR 24 1970

(SEAL)
Attest:

Edward M. Fletcher, Jr.
Attesting Officer

WILLIAM E. SCHUYLER, JR.
Commissioner of Patents